(12) United States Patent
Wu et al.

(10) Patent No.: US 12,626,402 B2
(45) Date of Patent: May 12, 2026

(54) PRECISE SLICE-LEVEL LOCALIZATION OF INTRACRANIAL HEMORRHAGE ON HEAD CTS WITH NETWORKS TRAINED ON SCAN-LEVEL LABELS

(71) Applicant: Northwestern University, Evanston, IL (US)

(72) Inventors: Yunan Wu, Evanston, IL (US); Todd Parrish, Chicago, IL (US); Aggelos Katsaggelos, Evanston, IL (US); Virginia Boyce Hill, Chicago, IL (US); Michael Alexander Iorga, Hillsboro, OR (US); Michael Anthony Drakopoulos, Chicago, IL (US); Amit Sanjay Adate, Evanston, IL (US); Shamal Shashi Lalvani, West Chester, OH (US); Andrew Mark Naidech, Evanston, IL (US); Donald Robinson Cantrell, Evanston, IL (US)

(73) Assignee: Northwestern University, Evanston, IL (US)

( * ) Notice: Subject to any disclaimer, the term of this patent is extended or adjusted under 35 U.S.C. 154(b) by 173 days.

(21) Appl. No.: 18/315,813

(22) Filed: May 11, 2023

(65) Prior Publication Data

US 2023/0368423 A1     Nov. 16, 2023

Related U.S. Application Data

(60) Provisional application No. 63/341,917, filed on May 13, 2022.

(51) Int. Cl.
*G06T 7/73* (2017.01)
*G06T 7/00* (2017.01)

(52) U.S. Cl.
CPC .............. *G06T 7/75* (2017.01); *G06T 7/0012* (2013.01); *G06T 2207/10081* (2013.01);
(Continued)

(58) Field of Classification Search
None
See application file for complete search history.

(56) References Cited

U.S. PATENT DOCUMENTS

2020/0219262 A1 * 7/2020 Hsiao ................... G06V 10/764
2022/0005192 A1 * 1/2022 Gao ........................ G06N 3/08

OTHER PUBLICATIONS

Unsupervised acute intracranial hemorhage segmentation with mixture module ; Kimmo et al. (Year: 2021).*
(Continued)

*Primary Examiner* — Nancy Bitar
(74) *Attorney, Agent, or Firm* — Benesch Friedlander Coplan & Aronoff LLP

(57) ABSTRACT

A weakly supervised intracranial hemorrhage (ICH) detection workflow includes training a deep learning (DL) model including a coupled convolutional neural network and recurrent neural network on a large dataset of CT scans with expert-labeled slices indicating presence or absence of ICH. Transfer learning (TL) is used to further train the DL model using a second large dataset of CT scans with only scan labels extracted from radiology reports using natural language processing (NLP). The DL model weights each slice of the scan against the final ICH diagnosis using an attention-based bi-directional long-short term memory network, where the attention weights represent slice-level ICH predictions. Model-generated heatmaps highlight significant regions of the CT scans that lead to the provided ICH predictions.

20 Claims, 8 Drawing Sheets

(52) U.S. Cl.
CPC .............. *G06T 2207/20081* (2013.01); *G06T 2207/20084* (2013.01); *G06T 2207/30016* (2013.01)

(56) References Cited

OTHER PUBLICATIONS

RADNET: Radiologist level accuracy using deep learning for hemorrhage detection in CT scans; Grewal et al. (Year: 2018).*

Voxels Intersecting Along Orthogonal Levels Attention U-Net for Intracerebral Haemorrhage Segmentation in Head CT; Liu et al. (Year: 2023).*

Iorga, M., et al., "Automated Labelling of Radiologic Findings in Head Computed Tomography Reports via Natural Language Processing [abstract]," Proceedings of the 59th ASNR, 2021, 3 pages.

Tan, M., et al., "EfficientNet: Rethinking Model Scaling for Convolutional Neural Networks," arXiv:190511946, 10 pages.

Anouk Stein, MD, et al., "RSNA Intracranial Hemorrhage Detection," Kaggle, 2019, <https://www.kaggle.com/c/rsna intracranial hemorrhage detection/overview>, 10 pages.

Selvaraju RR, et al., "Grad-CAM: Visual Explanations from Deep Networks via Gradient Based Localization," Computer Vision Foundation, 2020, 9 pages.

Iorga, M., et al., "Labeling Noncontrast Head CT Reports for Common Findings Using Natural Language Processing," AJNR Am J Neuroradiol 2022, 43 (5) 721-726, 7 pages.

* cited by examiner

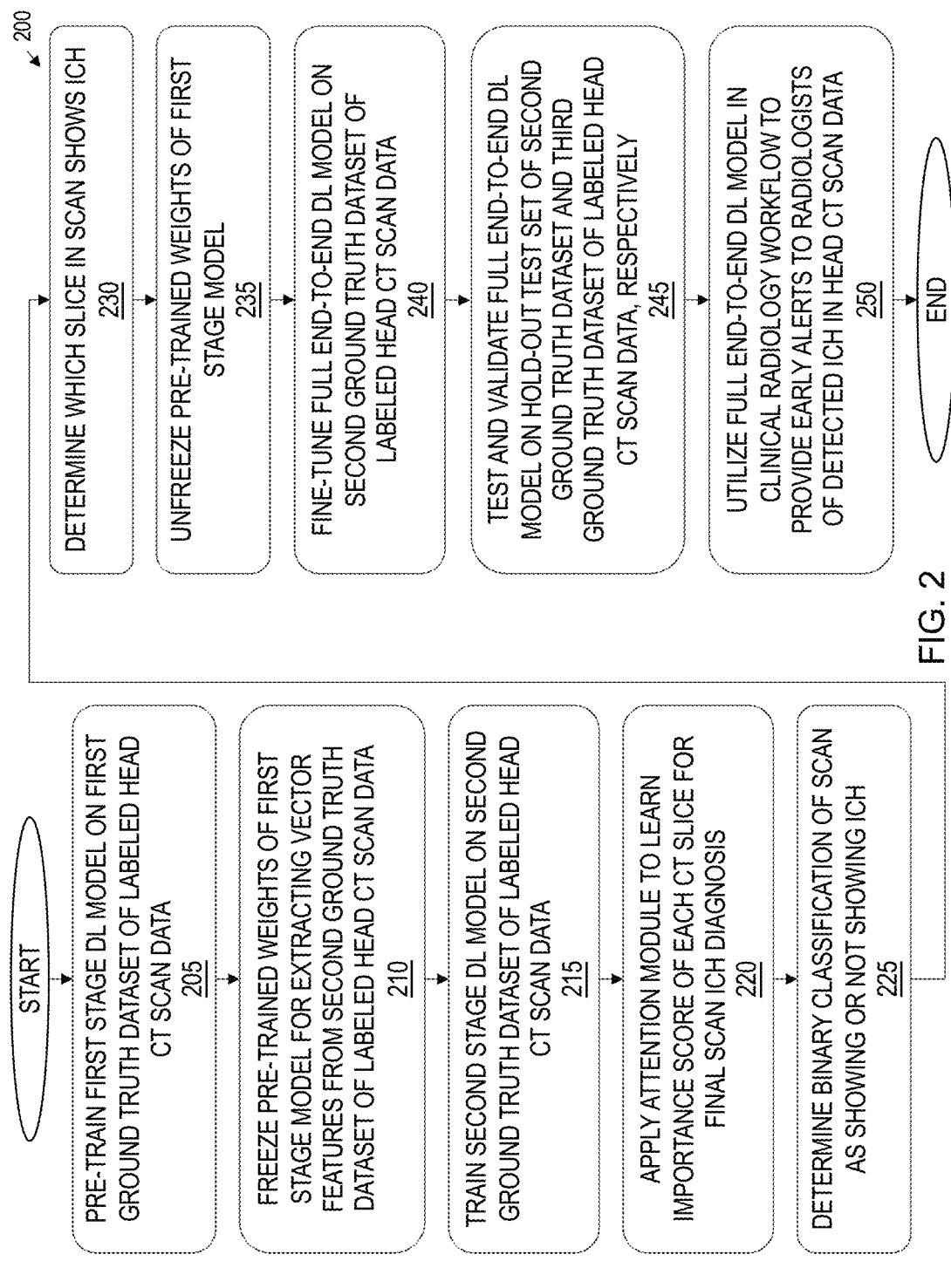

START

PRE-TRAIN FIRST STAGE DL MODEL ON FIRST GROUND TRUTH DATASET OF LABELED HEAD CT SCAN DATA
205

FREEZE PRE-TRAINED WEIGHTS OF FIRST STAGE MODEL FOR EXTRACTING VECTOR FEATURES FROM SECOND GROUND TRUTH DATASET OF LABELED HEAD CT SCAN DATA
210

TRAIN SECOND STAGE DL MODEL ON SECOND GROUND TRUTH DATASET OF LABELED HEAD CT SCAN DATA
215

APPLY ATTENTION MODULE TO LEARN IMPORTANCE SCORE OF EACH CT SLICE FOR FINAL SCAN ICH DIAGNOSIS
220

DETERMINE BINARY CLASSIFICATION OF SCAN AS SHOWING OR NOT SHOWING ICH
225

DETERMINE WHICH SLICE IN SCAN SHOWS ICH
230

UNFREEZE PRE-TRAINED WEIGHTS OF FIRST STAGE MODEL
235

FINE-TUNE FULL END-TO-END DL MODEL ON SECOND GROUND TRUTH DATASET OF LABELED HEAD CT SCAN DATA
240

TEST AND VALIDATE FULL END-TO-END DL MODEL ON HOLD-OUT TEST SET OF SECOND GROUND TRUTH DATASET AND THIRD GROUND TRUTH DATASET OF LABELED HEAD CT SCAN DATA, RESPECTIVELY
245

UTILIZE FULL END-TO-END DL MODEL IN CLINICAL RADIOLOGY WORKFLOW TO PROVIDE EARLY ALERTS TO RADIOLOGISTS OF DETECTED ICH IN HEAD CT SCAN DATA
250

END

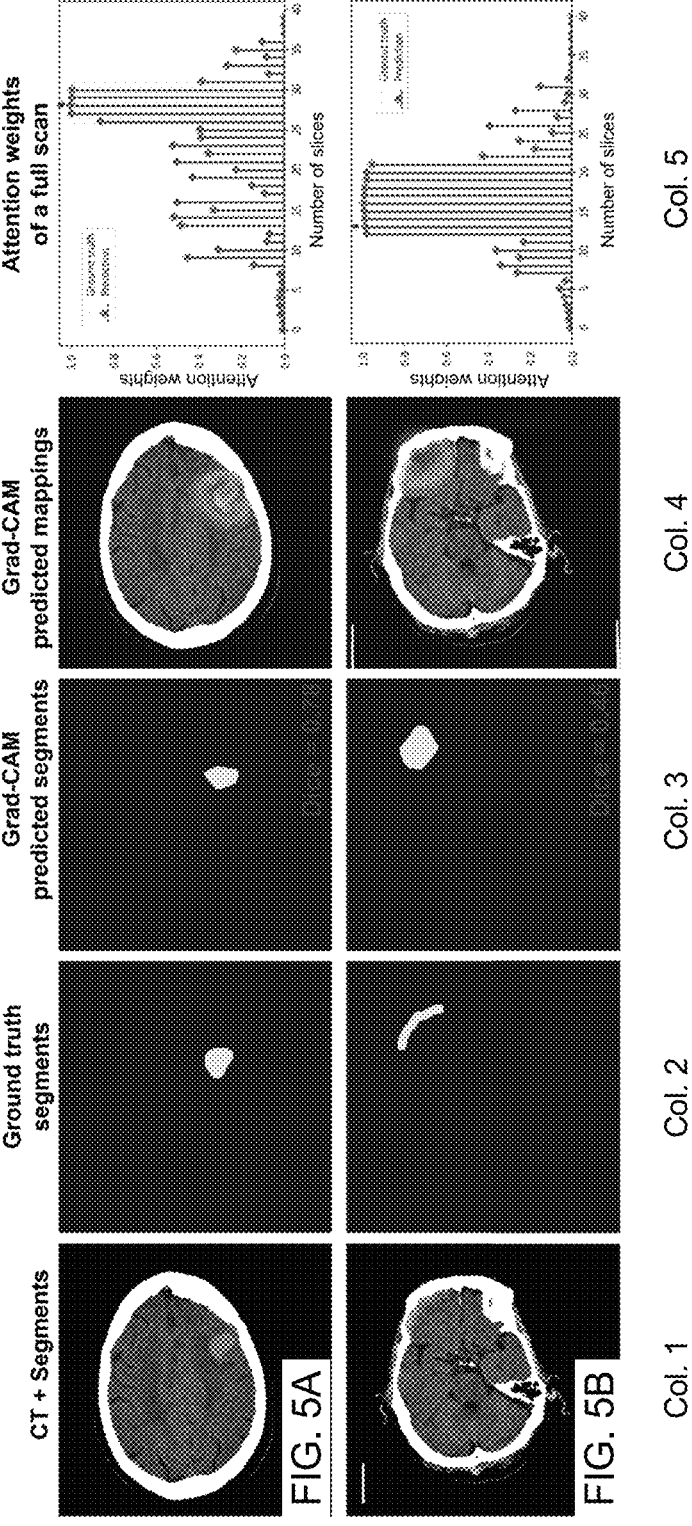

PRECISE SLICE-LEVEL LOCALIZATION OF INTRACRANIAL HEMORRHAGE ON HEAD CTS WITH NETWORKS TRAINED ON SCAN-LEVEL LABELS

CROSS REFERENCE TO RELATED APPLICATIONS

The present application claims the benefit of priority under 35 U.S.C. § 119 from U.S. Provisional Patent Application Ser. No. 63/341,917, entitled "Identification of Intracranial Hemorrhage and its Subtypes on Head CT Scans Using Transfer Learning and Weakly-Supervised Networks," filed on May 13, 2022, all of which is incorporated herein by reference in its entirety for all purposes.

TECHNICAL FIELD

The present disclosure generally relates to computed tomography, and more specifically relates to identification of intracranial hemorrhage and its subtypes on head computed tomography scans using transfer learning and weakly-supervised networks.

BACKGROUND

Acute intracranial hemorrhage (ICH) is a life-threatening medical emergency. ICH is devastating, accounting for ten percent (10%) to fifteen percent (15%) of all stroke cases with a high risk of mortality and disability. Radiologists typically read and interpret slice-level images produced by computed tomography (CT) head scans of a patient in order to diagnose ICH in the patient. Medical treatment of ICH may be delayed until the head scans are read and interpreted.

Deep learning (DL) is a machine learning technology that utilizes a neural network, such as a convolutional neural network (CNN), to and identify and classify patterns in newly presented data such as images based on prior data by which the neural network has been trained.

The description provided in the background section should not be assumed to be prior art merely because it is mentioned in or associated with the background section. The background section may include information that describes one or more aspects of the subject technology.

SUMMARY

An exemplary method for slice-level localization of intracranial hemorrhage (ICH) on head computed tomography (CT) scans includes configuring a deep learning (DL) model including a convolutional neural network (CNN) and a recurrent neural network (RNN). The CNN is initialized with first trained data for extracting important features from a CT scan for detecting an ICH. The RNN is initialized with second trained data for detecting an ICH in a CT scan. A CT scan is input into the CNN. Convolutional neural network processing of the CT scan is performed by the CNN for extracting important features from the CT scan for detecting an ICH. The processed CT scan including the extracted important features is output from the CNN to the RNN. Slices of the CT scan are processed, in parallel, by corresponding sequences of three fully connected layers of the RNN. Outputs of the parallel sequences of three fully connected layers are processed by a bi-directional long-short term memory module. Outputs of the bi-directional long-short term memory module are processed by an attention module to determine an ICH diagnosis of the CT scan. The ICH diagnosis is output.

Initializing the CNN with first trained data may include training the CNN on a first dataset of CT scans including slice-level labels indicating presence status of ICH. The presence status may identify the ICH as either being present or not present in the CT scan. The presence status may identify the ICH as either being present or not present in the CT slice. The presence status may identify a location within the CT slice where the ICH is present and/or an extent of the presence of the ICH.

Initializing the RNN with second trained data may include freezing the trained weight values of the CNN and training the RNN on a second dataset of CT scans including scan-level labels indicating presence status of ICH.

The method may further include fine-tuning the CNN and RNN by performing end-to-end DL model training with a third dataset of CT scans including scan-level labels indicating presence status of ICH.

The method may further include generating heatmaps showing important features for diagnosing ICH in CT slices based on gradient information flowing back to the last convolutional layer of the CNN.

The CNN may include an EfficientNet-B2 network.

The method may further include preprocessing the CT scan prior to inputting the CT scan into the CNN, the preprocessing including applying a plurality of different window functions to the CT scan, concatenating results of applying the different window functions to the CT scan in a third dimension orthogonal to the image axes of the CT scan, and inputting the concatenated windowed CT scans into the CNN.

Outputting the processed CT scan including the extracted important features from the CNN to the RNN may include reducing the feature size of the processed CT scan to a vector by a global average pooling (GAP) layer and outputting the vector to the RNN as extracted features for each slice.

The method may further include outputting probabilities of ICH by a last fully-connected layer of the CNN followed by a sigmoid activation function.

An exemplary method for slice-level localization of intracranial hemorrhage (ICH) on head computed tomography (CT) scans includes configuring a deep learning (DL) model including a convolutional neural network (CNN), a plurality of network pipelines in parallel that receive respective data from the CNN, each of the plurality of network pipelines including three serially coupled groupings of fully connected layers, LeakyReLU activation functions, and dropout layers, a bi-directional long-short term memory module that receives data from the plurality of network pipelines, and an attention module that receives data from the bi-directional long-short term memory module. The method further includes initializing the CNN with first trained data for extracting important features from a CT scan for detecting an ICH and initializing the plurality of network pipelines, bi-directional long-short term memory module, and attention module with second trained data for detecting an ICH in a CT scan. The method further includes inputting a CT scan into the CNN and performing convolutional neural network processing of the CT scan by the CNN for extracting important features from the CT scan for detecting an ICH. The method further includes outputting the processed CT scan including the extracted important features from the CNN to the plurality of network pipelines. The method further includes processing slices of the CT scan, in parallel, by corresponding network pipelines of the plurality of network pipelines. The method further includes processing outputs of the plurality of network pipelines by the bi-directional long-short term memory module, processing outputs of the bi-directional long-short term memory module by the attention module to determine an ICH diagnosis of the CT scan, and outputting the ICH diagnosis.

Initializing the CNN with first trained data may include training the CNN on a first dataset of CT scans including slice-level labels indicating presence status of ICH.

Initializing the plurality of network pipelines, bi-directional long-short term memory module, and attention module with second trained data may include freezing the trained weight values of the CNN and training the plurality of network pipelines, bi-directional long-short term memory module, and attention module on a second dataset of CT scans including scan-level labels indicating presence status of ICH.

The method may further include fine-tuning the CNN and the plurality of network pipelines, bi-directional long-short term memory module, and attention module by performing end-to-end DL model training with a third dataset of CT scans including scan-level labels indicating presence status of ICH.

The method may further include generating heatmaps showing important features for diagnosing ICH in CT slices based on gradient information flowing back to the last convolutional layer of the CNN.

The CNN may include an EfficientNet-B2 network.

The method may further include preprocessing the CT scan prior to inputting the CT scan into the CNN, the preprocessing including applying a plurality of different window functions to the CT scan, concatenating results of applying the different window functions to the CT scan in a third dimension orthogonal to the image axes of the CT scan, and inputting the concatenated windowed CT scans into the CNN.

Outputting the processed CT scan including the extracted important features from the CNN to the plurality of network pipelines may include reducing the feature size of the processed CT scan to a vector by a global average pooling (GAP) layer and outputting the vector to the plurality of network pipelines as extracted features for each slice.

The method may further include outputting probabilities of ICH by a last fully-connected layer of the CNN followed by a sigmoid activation function.

An exemplary method for slice-level localization of intracranial hemorrhage (ICH) on head computed tomography (CT) scans includes initializing an EfficientNet-B2 network with first trained data for extracting important features from a CT scan for detecting an ICH, and initializing a plurality of network pipelines disposed in parallel, a bi-directional long-short term memory module coupled with outputs of the plurality of network pipelines, and an attention module coupled with outputs of the bi-directional long-short term memory module with second trained data for detecting an ICH in a CT scan. The method further includes preprocessing an input CT scan, the preprocessing including applying a plurality of different window functions to the CT scan, concatenating results of applying the different window functions to the CT scan in a third dimension orthogonal to the image axes of the CT scan, and inputting the concatenated windowed CT scans into the EfficientNet-B2 network. The method further includes performing convolutional neural network processing of the CT scan by the EfficientNet-B2 network for extracting important features from the CT scan for detecting an ICH. The method further includes outputting the processed CT scan including the extracted important features from the EfficientNet-B2 network to the plurality of network pipelines. The method further includes processing slices of the CT scan, in parallel, by corresponding network pipelines of the plurality of network pipelines. The method further includes processing outputs of the plurality of network pipelines by the bi-directional long-short term memory module. The method further includes processing outputs of the bi-directional long-short term memory module by the attention module to determine an ICH diagnosis of the CT scan. The method further includes generating heatmaps showing important features for diagnosing ICH in CT slices based on gradient information flowing back to the last convolutional layer of the EfficientNet-B2 network, and outputting the ICH diagnosis.

The method may further include fine-tuning the EfficientNet-B2 network and the plurality of network pipelines, bi-directional long-short term memory module, and attention module by performing training with a dataset of CT scans including scan-level labels indicating presence status of ICH.

An exemplary non-transitory computer readable medium stores computer-readable instructions executable by a hardware computing processor to perform operations of a method for slice-level localization of intracranial hemorrhage (ICH) on head computed tomography (CT) scans as described herein.

An exemplary system for . . . includes at least one device including a hardware computing processor, the system being configured to perform operations of a method for slice-level localization of intracranial hemorrhage (ICH) on head computed tomography (CT) scans as described herein. The system may include a non-transitory memory having stored thereon computing instructions, executable by the hardware computing processor, to perform operations of a method for slice-level localization of intracranial hemorrhage (ICH) on head computed tomography (CT) scans as described herein.

An exemplary system for slice-level localization of intracranial hemorrhage (ICH) on head computed tomography (CT) scans includes at least one device including a hardware circuit operable to perform a function, the system being configured to perform operations of a method for slice-level localization of intracranial hemorrhage (ICH) on head computed tomography (CT) scans as described herein.

BRIEF DESCRIPTION OF DRAWINGS

The disclosure is better understood with reference to the following drawings and description. The elements in the figures are not necessarily to scale, emphasis instead being placed upon illustrating the principles of the disclosure. Moreover, in the figures, like-referenced numerals may designate to corresponding parts throughout the different views.

FIG. 2 is a flowchart that illustrates an exemplary method of training and using a DL model for ICH identification in CT scan images.

FIGS. 5A-5B are exemplary CT scan and Grad-CAM-generated heatmap images and corresponding graphs that illustrate interpretability of the weakly supervised DL model for localizing ICH at the slice and pixel level.

Figure 1A:
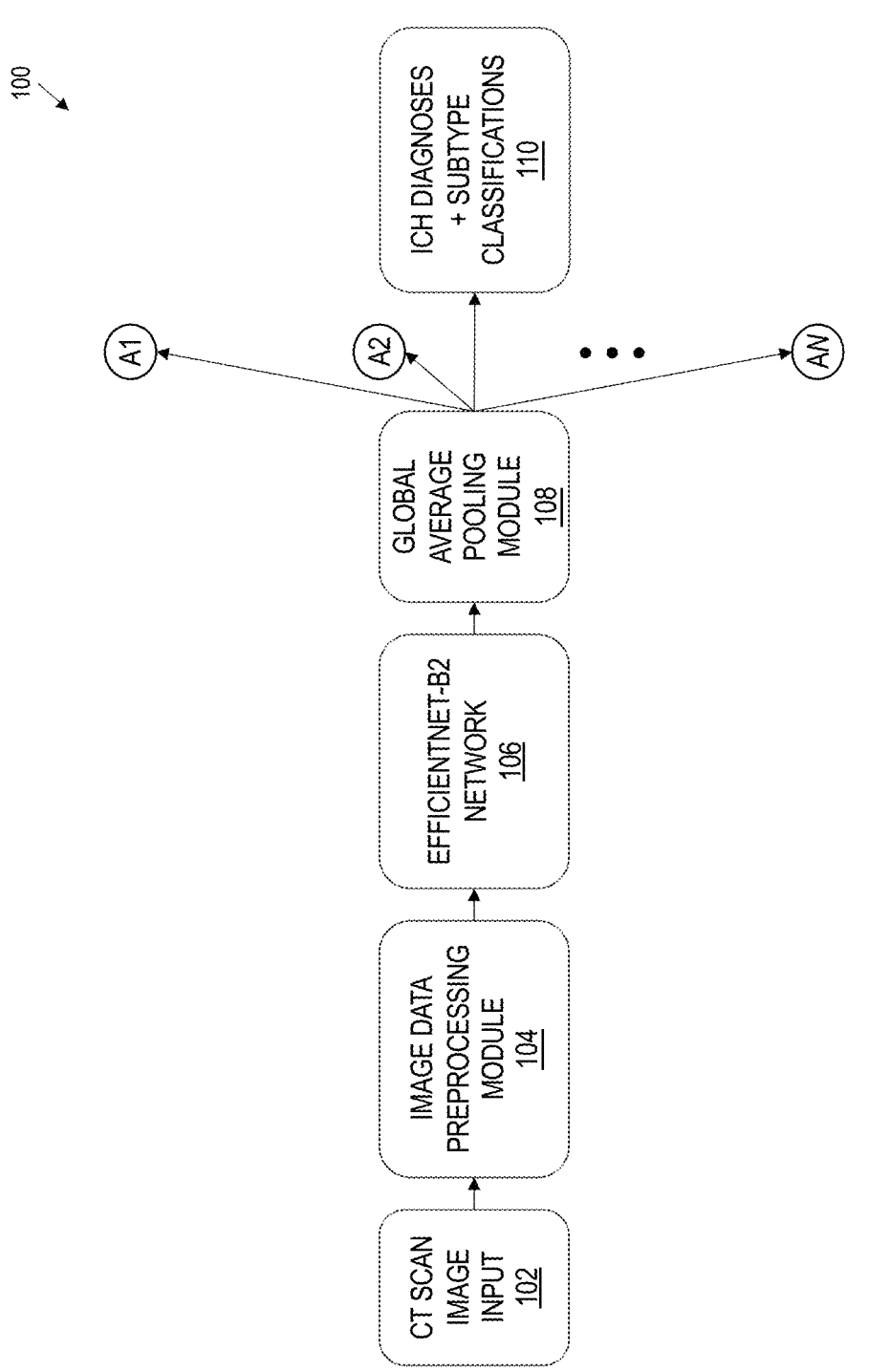
FIG. 1A is a diagram that illustrates an exemplary first stage 100 of a deep learning (DL) model architecture for identification of ICH in head CT scans.

In one or more implementations, not all of the depicted components in each figure may be required, and one or more implementations may include additional components not shown in a figure, including alternative artificial intelligence concepts and/or deep learning network architecture. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Systems and methods utilizing deep learning (DL) in neural networks may be trained to detect intracranial hemorrhage (ICH) in head CT scan images. These systems may alert radiologists of the detected ICH in patients so that medical treatment of the ICH may be initiated faster. Described herein is a weakly-supervised DL model using transfer learning (TL) and an attention-based long-short term memory (LTSM) network trained on scan-level labels for automated detection and localization of slice-level ICH with good generalizability to facilitate clinical workflows. Scan-level labels of CT scan data do not include any information on the individual slices. Slice-level labels, which do include information on the individual slices, take expertise and are time consuming to provide.

Performing a non-contrast computed tomographic (NCCT) scan is typically the first and most efficient step in diagnosing ICH. However, studies show that excessive workloads, discrepancies among radiologists, and inadequate equipment and scan quality may result in clinical misinterpretations and unnecessary medical spending, such as additional imaging costs. In addition, according to various surveys, the thirty-day (30-day) mortality rate for ICH is nearly forty percent (40%), with half of these deaths occurring within the first forty-eight (48) hours after the onset of ICH. These facts emphasize the importance of early diagnosis and effective treatment of ICH.

Deep learning (DL)-based models may be developed and utilized as tools to automate diagnosis of ICH. The DL-based models may be trained on very large databases (e.g., the Radiological Society of North America (RSNA) dataset, released in 2019) using convolutional neural networks (CNNs). Some examples of DL-based models include two-dimensional (2D) CNN structures utilized on individual CT slices. Some 3D CNN models may benefit from volumetric features of CT scans and thereby overcome limitations of 2D examples that result from ignoring relationships between sequential scan slices. The 3D CNN models may down-sample or subset 3D inputs to avoid the problem of insufficient computation memory. The performance of 3D models may be limited by the loss of complete slice information. Described herein is a model that features end-to-end joint 2D CNNs with recurrent neural networks (RNNs) to detect ICH, where 2D CNNs may extract features from each single slice, while RNNs leverage the spatial interslice information at the scan level.

A challenge to develop DL in clinical applications has been to train the neural networks using ground truth data sets including precise manual labeling and good interpretability. In general, the more detailed and precise annotations of training data sets are, the more accurate DL models trained using those data sets may be. However, annotating the training data sets (e.g., segmentation or localization of ICH) precisely and in detail may be labor-intensive and time-consuming. Other challenges include a lack of transparency and interpretation of model predictions, which may reduce reliability of DL models. To be useful and practical in clinical applications, DL models may be integrated into and facilitate clinical workflows of radiologists to perform medical diagnoses of brain CT scans more quickly and accurately, rather than merely providing computationally predicted diagnoses.

FIG. 1A is a diagram that illustrates an exemplary first stage 100 of a DL model architecture for identification of ICH in head CT scans. The first stage 100 may be a front end of an end-to-end DL workflow for training and using a neural network to identify ICH in CT scans. The end-to-end DL workflow may include a weakly supervised model trained on all scan-level labels of a dataset of labeled CT scan images. The training may be performed by using transfer learning (TL) from the scan slices from the RSNA dataset and attention-based LSTM to automatically detect and localize ICH at the scan slice level. The training of the end-to-end DL model may be performed in three stages: pre-training a neural network on the RSNA dataset at the slice level (in the first stage 100), training an attention-based bi-directional-LSTM network at the scan level on latent features of a local dataset extracted from the first stage 100 (in a second stage 120), and fine-tuning the end-to-end DL workflow model using additional CT scan datasets.

A dataset of labeled CT scan images (e.g., the RSNA dataset) may be serially input to the first stage 100 via a CT scan image input 102. In an example, the CT scan images may have pixel dimensions of 512×512. The input CT scan images may be preprocessed by an image data preprocessing module 104, for example, using one or more windowing functions to change image brightness and apparent contrast and consequently enhance the appearance of different types of tissues.

In clinical practice, radiologists often manipulate a windowing function to represent a range of data values (e.g., relative quantitative measurement of radiodensity in Hounsfield Units (HU)) that the radiologist desires to visualize or display in the image. A window width (W) may represent the range of HU values (or CT numbers) to display, and a window center (C) may represent a midpoint of the range. Modifying W and C may alter image contrast on specific tissues or scan elements, e.g., bone or calcium, brain parenchyma, fluid or edema, and hemorrhage. For example, a wide window width displays a wider range of HU values so that darker and lighter structures may be seen in the image with a reduced contrast but greater detail. A narrow window width increases contrast between structures but less detail may be visible. Decreasing the window center may brighten the image, and vice versa.

Correspondingly, the image data preprocessing module 104 may apply window functions to mimic how radiologists adjust the window parameters [W, C] to diagnose brain CT scan images. For example, a first window parameter set may be configured for brain parenchyma image analysis ([80, 40]), a second window parameter set may be configured for soft tissue image analysis ([400, 80]), and a third window parameter set may be configured for stroke or infarct image analysis ([30, 30]). In an example, the configured window parameter sets [W, C] of [80, 40], [400, 80], and [30, 30] may be applied on each CT image slice by the image data preprocessing module 104 to enhance the visibility of ICH. After applying the three windows to the input CT image, the image data preprocessing module 104 may rescale the windows' images to have pixel values between 0 and 1 by performing min-max normalization, and then convert the input single-channel CT image into a three-channel CT image by concatenating the three windowed images (in depth). In an example, the three-channel CT image may have pixel dimensions 512×512×3.

The preprocessed three-channel CT images output from the image data preprocessing module 104 may then be utilized to pre-train an EfficientNet-B2 network 106. For example, the EfficientNet-B2 network 106 may be pre-trained on the 2019 RSNA dataset as an ICH classification model at the slice level. The EfficientNet-B2 network 106 is a convolutional neural network (CNN) architecture and scaling method that uses a compound coefficient to uniformly scale all dimensions of depth, width, and resolution. With its smaller parameter size, the EfficientNet-B2 network 106 may achieve better efficiency than other CNN architectures. The EfficientNet-B2 network 106 may be well-suited to the ICH identification application discussed herein based on the model size and input image resolution. The EfficientNet-B2 network 106 is presented and described herein as an example because of its good performance and high efficiency in many medical classification tasks. However, this should not be construed as limiting. In various examples, the EfficientNet-B2 network 106 may be replaced with another type or configuration of neural network.

In an example discussed herein, the input image size to the EfficientNet-B2 network 106 is 512×512×3 and the feature size output from its last CNN to a global average pooling (GAP) module 108 is 16×16×1408. The GAP module 108 may reduce the 16×16×1408 feature size received from the EfficientNet-B2 network 106 to a vector size of 1408 prior to being sent to a second stage 120 as extracted features for each slice of the CT scan.

In an example, image data at the last convolutional layer of the EfficientNet-B2 network 106 may be visualized as discriminative feature maps using gradient-weighted class activation mapping (Grad-CAM). Grad-CAM visualization may be performed by using the gradient information flowing back to the last convolutional layer of the EfficientNet-B2 network 106 to generate heatmaps highlighting important regions for the DL model to make determinations regarding the presence or absence of ICH. Grad-CAM visualization is described in greater detail with respect to operation 250 of FIG. 2.

The first stage 100 may utilize a large existing database (e.g., the RSNA dataset) to train certain layers of the DL model, while the pre-trained DL model may be further optimized for a specific task on another dataset. This methodology may be referred to as a transfer learning (TL) methodology. TL methodologies may be effective in the medical field due to a general lack of labeled datasets for training DL models. TL methodologies may improve DL model performance and mitigate overfitting issues. For example, after pre-training the ICH classification model on the RSNA dataset at the slice level, the pre-trained ICH classification model may be applied to a second dataset (e.g., a local institution's CT scan dataset), extracting features of each slice (A1, A2, . . . , AN) after the global average pooling (GAP) layer 108 and feeding the slices A1, A2, . . . , AN to a second stage 120 as a whole scan.

The last fully-connected layer, followed by a sigmoid activation function, may output the probabilities of ICH and its five subtypes, represented by the block ICH diagnoses and subtype classifications 110. In an example described herein, the loss function is the weighted binary cross-entropy loss, defined as Eq. (1):

$$L = \frac{1}{N \cdot C} \sum\nolimits_{n=1}^{N} \sum\nolimits_{c=1}^{C} (p_n^c \log \hat{p}_n^c + (1 - p_n^c) \log(1 - \hat{p}_n^c)) \cdot W_c, \quad (1)$$

where N is the input size, C is the number of classes, p and $\hat{p}$ are the ground truth and the predicted score for each class c, and $W_c$ is the weight assigned to each class c, which is inversely proportional to the number of classes and is normalized so that $$\sum\nolimits_{c}^{C} W_c = 1.$$

In the example evaluated and described herein, the batch size was 16 and the optimizer was Adam with an initial learning rate of 0.0005.

In other examples, the loss function may be a binary-cross entropy loss as defined in Eq. (2):

$$l = -\frac{1}{N} \sum_{i=1}^{N} \{\beta \cdot y_i \log \hat{y}_i + (1 - \beta) \cdot (1 - y_i) \log(1 - \hat{y}_i)\}, \quad (2)$$

where $y_i$ are real labels, $\hat{y}_i$ are predicted labels, N is batch size, $\beta$ is a penalty factor to deal with class imbalance.

Figure 1B:
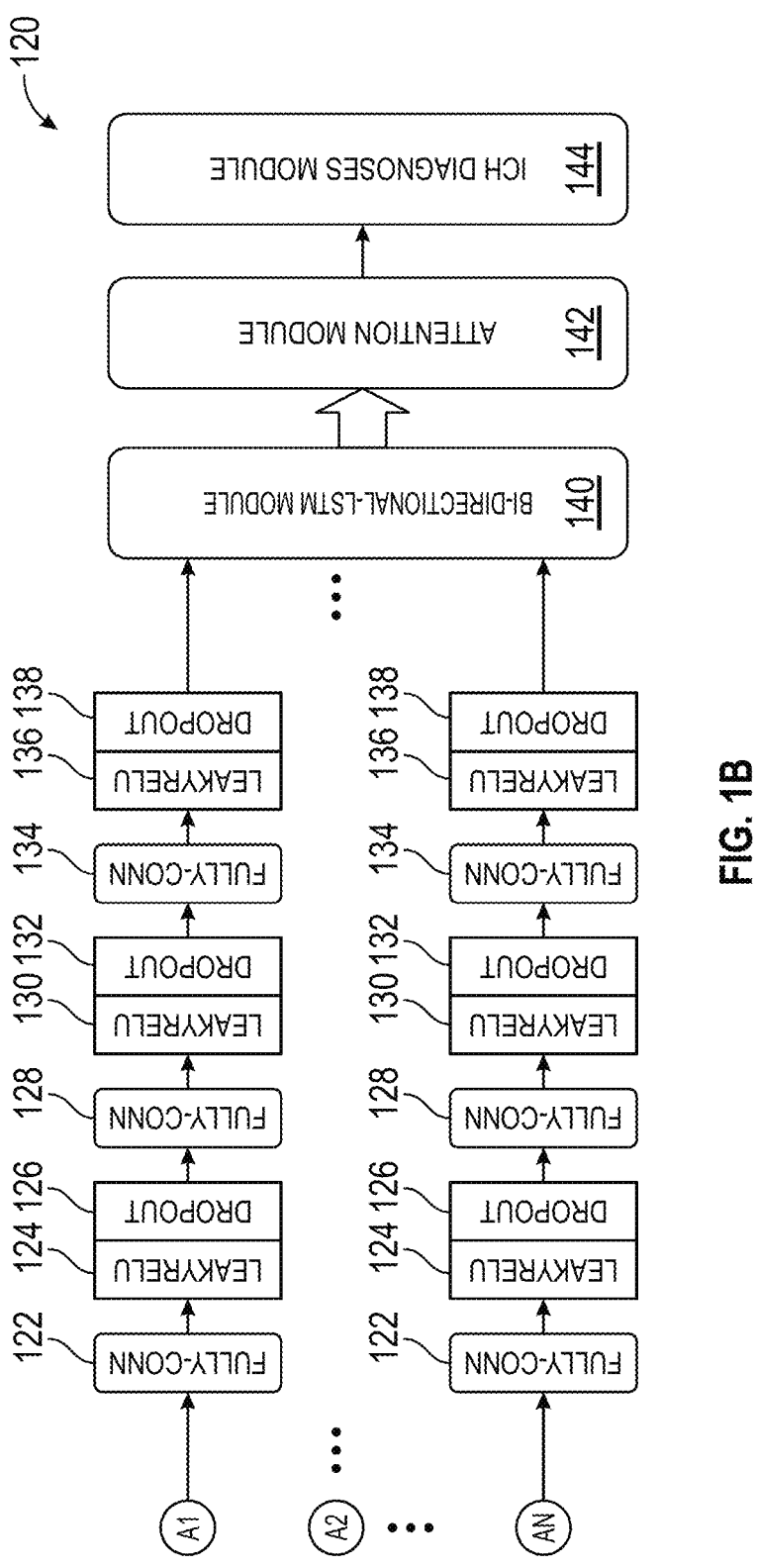
FIG. 1B is a diagram that illustrates an exemplary second stage 100 of the DL model architecture for identification of ICH in head CT scans.

FIG. 1B is a diagram that illustrates an exemplary second stage 120 of the DL model architecture for identification of ICH in head CT scans. The second stage 120 may include recurrent neural networks (RNNs) that leverage spatial interslice information at the scan level. Each slice (A1, A2, . . . , AN) from the first stage 100 may be input into a separate pipeline of the second stage 120, each of which feeds into a bi-directional-LSTM module 140. Each of the pipelines of the second stage 120 may include a repeatedly serially concatenated grouping of processing modules for processing the respective input slice data. Each of the concatenated groupings of processing modules may include a fully-connected module 122, 128, 134, a leaky rectified linear unit (ReLU) module 124, 130, 136, and a dropout module 126, 132, 138. Three serially concatenated groupings of these processing modules are shown in FIG. 1B, but this should not be construed as limiting, as other quantities of serially concatenated groupings may be included in various examples. Given that the input to the first fully-connected module 122 is a 1408 element vector in the example evaluation described herein, the data dimension output from the fully-connected module 122 is a 512 element vector. The data dimension output from the dropout module 126 is a 256-element vector and the data dimension output from the dropout module 132 is a 128-element vector in the example evaluation described herein.

A limitation of using two-dimensional (2D) convolutional neural network (CNN) architectures in ICH classification applications may include that each slice is considered independent of other slices, with a loss of important relevant features of neighboring slices. In addition, three-dimensional (3D) CNN architectures may be limited by a large number of model parameters which may cause memory shortages when models are complex or processed in large batches. Attempting to compensate for these limitations by downsampling volumes or performing batch training may degrade the model's performance due to losing the complete image information.

The LSTM network (e.g., the bi-directional LSTM module 140) may learn long-term dependencies by manipulating three different gates that remove or add information from previous time points to update its current cell state. A "forget" gate may discard useless information from previous time points, an "input" gate may store new information from the current time point, and an "output" gate may determine how much information is to be output to the next time point. As brain CT scans may be viewed in an axial plane from top-to-bottom or bottom-to-top, an attentional bi-directional-LSTM network may be used in the bi-directional-LSTM module 140 to cause a middle slice to be equally affected by neighboring slices on both sides to make predictions on a full CT scan. As attention weights in the bi-directional-LSTM network may predict accurate labels at the slice level, they may be utilized in the second stage 120 to indicate which exact slice in a complete CT scan may include an ICH.

The attention module 142 may receive data from the bi-directional-LSTM module 140, the data corresponding to each of the pipelines that provide slice data to the bi-directional-LSTM module 140. The attention module 142 may make and output an ICH diagnosis 144 as to whether the analyzed scan includes an ICH or is normal. The attention module 142 may assign an importance score to each CT scan slice that is representative of slice-level labeling. In exemplary model test and evaluations as described herein, the accuracy of attention weights in predicting slice-level labels was confirmed by the consistency between the attention weights and the ground truth labels. Attention layers may play an important role in extracting more useful slice information.

Figure 1C:
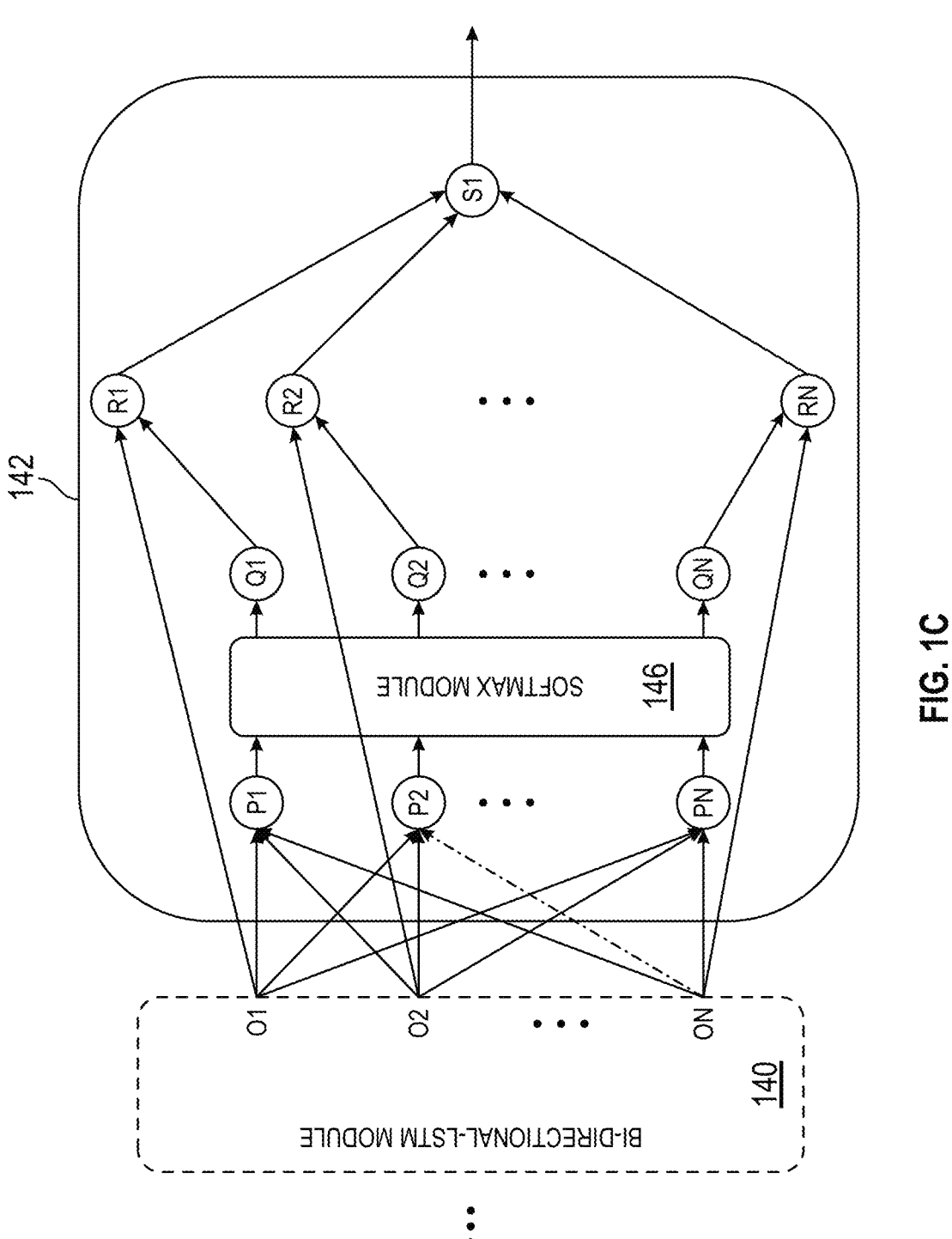
FIG. 1C is a diagram that illustrates further details of the exemplary attention block of the DL model architecture for identification of ICH in head CT scans.

FIG. 1C is a diagram that illustrates further details of the exemplary attention module 142 of the DL model architecture for identification of ICH in head CT scans. The attention module 142 may include a quantity of input port summers P1, P2, . . . , PN that equal a quantity of output ports O1, O2, . . . , ON through which data exits the bi-directional-LSTIM module 140. The quantity of output ports O1, O2, . . . , ON of the bi-directional-LSTIM module 140 may equal the quantity of slice inputs A1, A2, . . . , AN to the second stage 120 and the quantity of RNN pipelines that process the slice inputs and then output the processed slice inputs into the bi-directional-LSTM module 140. Each of the outputs O1, O2, . . . , ON of the bi-directional-LSTIM module 140 may connect to each of the input port summers P1, P2, PN of the attention module 142. In exemplary embodiments, each of the input port summers P1, P2, PN may apply a different weight to each input connected thereto prior to summing them together. Each of the input port summers P1, P2, . . . , PN may then output its summed weighted input data to a softmax module 146 for performing a softmax function on these input values. The softmax function may convert the input vector by normalizing it into a probability distribution in which each output vector value Q1, Q2, . . . , QN will be between 0 and 1, and the sum of all output vector values Q1, Q2, . . . , QN will be equal to 1. A series of weighted summing nodes R1, R2, . . . , RN may apply a weight to a corresponding output value Q1, Q2, . . . , QN from the softmax module 146 and a weight to a corresponding output value O1, O2, . . . , ON of the bi-directional-LSTIM module 140 prior to summing them and outputting the summed value to a final summer S1. The final summer S1 may apply a weight to each of the output values from the weighted summing nodes R1, R2, . . . , RN prior to summing them and outputting a single value to the ICH diagnoses module 144.

FIG. 2 is a flowchart that illustrates an exemplary method 200 of training and using a DL model for ICH identification in head CT scan images. The method 200 may be performed by a computing processor executing a series of instructions stored in a memory or on a non-transitory machine-readable memory. For example, the computing processor may include one or more NVIDIA QUADRO RTX 8000 graphics processing units (GPUs). The method 200 may be performed using a library of computing instructions executable on a computing processor for performing numerical computations, for example, TENSORFLOW 2.4 in PYTHON 3.7. The method 200 may be performed by a deep learning neural network model architecture, for example, as illustrated in FIGS. 1A-1C herein. The method 200, in various embodiments, may be implemented with fewer or more operations than illustrated and described in this example shown in FIG. 2. Some operations and/or procedures in the drawing illustrating method 200 may be substituted with others in various examples and/or instantiations of the method 200. In various examples and implementations, operations, procedures, method steps, and algorithms discussed elsewhere in this disclosure may be substituted for, added to, and/or combined with any of the operations and/or procedures illustrated in and discussed with reference to FIG. 2.

In an operation 205, a first stage DL model (e.g., first stage 100) may be pre-trained on a first ground truth dataset of labeled head CT scan image data. Pre-training the first stage DL model may be included in a phase one of a three phase DL model training process. The first stage DL model may include a convolutional neural network (CNN), for example, the EfficientNet-B2 network 106. The first ground truth dataset of labeled head CT scan image data may include the 2019 RSNA dataset of CT scan data, labeled at the slice level for ICH. The 2019 RSNA dataset is a public dataset with slice labels and five subtypes. Table 1 provides information about the 2019 RSNA dataset.

TABLE 1

| Data Distribution of 2019 RSNA Challenge | | | | | | |
|---|---|---|---|---|---|---|
| Types: | Normal | ICH | EDH | IPH | IVH | SAH | SDH |
| # of slices: | 415534 | 69997 | 1959 | 23424 | 17046 | 23227 | 30651 |

In an operation 210, the pre-trained weights of the first stage DL model (e.g., the EfficientNet-B2 network 106) may be frozen for extracting vector features from a second ground truth dataset of labeled head CT scan data. The first stage DL model may be untrainable while frozen. The pre-trained weights may be utilized in extracting vector features from the second ground truth dataset so that they may be utilized in training a second stage DL model (e.g., second stage 120) on the second ground truth dataset. Operations 210-230 may be included in a phase two of the three phase DL model training process.

In an operation 215, the second stage DL model (e.g., second stage 120) may be trained on the second ground truth dataset of labeled head CT scan data. The second stage DL model may include recurrent neural networks (RNNs) that leverage spatial interslice information at the scan level. In an example described herein, the second ground truth dataset may include a large collection of head CT scans labeled at the scan level for ICH according to natural language processing (NLP)-based extraction of diagnoses from radiology reports corresponding to the head CT scans. In an example described herein, the second ground truth dataset is from a hospital and includes a total of 14,648 scans, of which 3,748 (80%) are for training, 938 (20%) are for validation, and 10,000 are for testing.

Slice vector features extracted in operation 210 may be fed into a pipeline of three fully-connected layers (e.g., each slice vector feature A1, A2, . . . , AN output from the first stage 100 feeding into a fully-connected layer 122 with two other fully-connected layers 128, 134 downstream in the pipeline), each of the fully-connected layers 122, 128, 134 having a respective LeakyReLU activation function 124, 130, 136 and dropout layer 126, 132, 138 to extract more discriminative features with a lower dimensionality, e.g., a dimensionality of 128. All slice features (e.g., A1, A2, . . . , AN) from the same scan may be trained in parallel in the second stage 120 and be fed into a bi-directional-LSTM network (e.g., the bi-directional LSTM module 140) in their respective brain CT sequence (i.e., top-to-bottom axial plane). The bi-directional-LSTM network outputs may remain in sequence with a feature size of $V_i \in R^{1 \times 128}$ for each slice i (=1, 2, . . . , k).

In an operation 220, an attention layer $L_{Att}$ (e.g., attention module 142) may be applied to output from the bi-directional-LSTM network (e.g., bi-directional-LSTM module 140) to weight each slice differently and to learn an importance score $\alpha_i$ of each CT slice i for a final scan ICH diagnosis. The attention layer $L_{Att}$ and importance score $\alpha_i$ may be defined by Eq. 3 and Eq. 4, respectively:

$$L_{Att}(V) = \sum_{i=1}^{k} \alpha_i V_i, \qquad (3)$$

$$\alpha_i = \frac{\exp\{V_i \cdot \tanh(V_i \cdot w + b)\}}{\sum_{j=1}^{k} \exp\{V_j \cdot \tanh(V_j \cdot w + b)\}}, \qquad (4)$$

where $w \in R^{128 \times 1}$ and $b \in R^{1 \times 1}$, which functions similarly to a fully-connected layer with kernel size of k. The differentiable function tanh may facilitate the model to be impacted by both negative and positive inputs. Note that the output feature size of the attention layer here is the same as $V_i$, followed by a fully connected layer with a sigmoid activation function (e.g., ICH diagnoses module 144) for binary classification of a scan (i.e, ICH or non-ICH) (operation 225). As $\alpha_1$ has the potential to predict accurate labels at the slice level, it is used in the DL model described herein to indicate which exact slice in a scan showed the ICH (operation 230). The loss function may be the binary-cross entropy.

In the example evaluated and described herein, the batch size was set to sixty-four (64) and the optimizer was set as Adam with an initial learning rate of 0.00001.

In an operation 235, the pre-trained weights of the first stage model (e.g., a CNN model such as the EfficientNet-B2 network 106) may be unfrozen. By unfreezing the weights, the first stage model may once again be trained. Operations 235-240 may be included in a phase three of the three phase DL model training process.

In an operation 240, further training of the full end-to-end DL model may fine-tune the model on the second ground truth dataset of labeled head CT scan data. This may be the same dataset on which the second stage model was trained in phase two of the three phases of model training. In the example evaluated and described herein, the batch size was set to eight (8) and the optimizer was set as Adam with an initial learning rate of 0.00001.

In an operation 245, the full end-to-end DL model may be tested using a hold-out test set that is set aside from the second ground truth dataset (e.g., 20% of the of the second ground truth dataset, for example the hold-out test set 340) and validated on a third ground truth dataset of labeled head CT scan data.

Testing the full end-to-end DL model using the hold-out test set may include evaluating the performance of mappings that potentially localize the ICH, by radiologists manually segmenting each of a designated portion (e.g., 50) of head CT scans from the hold-out test set at the pixel level. Each mapping may then be converted from the model to a binary mask with a threshold of 0.5. Dice scores may then be calculated based on the masks predicted from Grad-CAM mappings and the ground truth labeled by radiologists to evaluate the predictions on that sampled dataset (i.e., the designated portion from the hold-out test set).

Testing the full end-to-end DL model using the hold-out test set may include comparing the DL model's ICH diagnoses performance with manual radiologist ICH diagnoses. A set of head CT scans (e.g., 30) may be randomly designated from the hold-out test set for radiologist interpretation. Radiologists may then be called upon to confirm the designated cases in a double-blind clinical setting. The radiologists may then provide overall diagnosis (i.e., ICH or non-ICH) of each scan as well as associated positional details (e.g., slice and position within slice). Another radiologist may then be called upon to doubly confirm the ground truth of the randomly designated cases by reviewing the radiology reports and the scans themselves to resolve any diagnostic discrepancies between radiologists who had already reviewed them and provided their overall diagnoses.

The third ground truth dataset in the example evaluation described herein is a CQ500 CT scan dataset. In the example evaluated and described herein, diagnosing ICH on a single scan using GPUs took 0.6 seconds on average, while it took 15 seconds using CPUs instead.

In an operation 250, the full end-to-end DL model may be utilized as part of a clinical radiology workflow to provide early alerts to radiologists of detecting ICH in head CT scan data, and thereby speed up initiation of patient treatment for ICH. As neural networks such as CNNs and the EfficientNet-B2 network 106 tend to be effectively "black boxes" in regards to their decision-making processes, with a lack of transparency and interepretability, making any reasoning behind model predictions difficult to understand. Therefore, medical doctors may not be eager to accept their decisions without some explanations regarding the reasoning behind how they arrived at those decisions. This is a problem that tends to slow down the process of applying DL models in clinical practice. Grad-CAM (gradient-weighted class activation mapping) is a visualization technique for generating images that visualize important features extracted by the model to provide reasoning behind decisions made by CNN-based models (e.g., the ICH identification DL model described herein) and thereby make the decisions more transparent. Grad-CAM uses the gradients of the prediction pc, flowing into the last convolutional layer to generate a localization map that highlights the significant regions of the prediction of that image, which is defined as:

$$M_{Grad-CAM} = ReLU\left(\sum_{k} \alpha_k^c A^k\right), \qquad (5)$$

where $$\alpha_k^c = \frac{1}{Z}\sum_{j}\sum_{i}\frac{\partial p^c}{A_{ij}^k}$$

is the neuron importance weight of each mapping $A^k$ in each channel k.

$$A_{ij}^k$$

denotes the value at each pixel location (i,j) of each mapping $A^k$ generated from the last convolutional layer and Z is the number of pixels in the mapping. The ReLU(•) operation processes only the positive values and ignores all negative values as 0. Finally, $M_{Grad-CAM}$ may be normalized in the range of 0 to 1, interpolated to the size of the original image, and overlaid on the input image to map the locations most likely used for predicting ICH, as was done in the example evaluated and described herein.

Grad-CAM may be utilized to generate heatmaps highlighting important regions for the DL model to make final decisions and determinations regarding predicting ICH by using the gradient information flowing back to the last convolutional layer of the EfficientNet-B2 network 106. $M_{Grad-CAM}$ may be a mapping that is calculated with a weighted combination of feature maps to generate discriminative feature maps. The generated discriminative feature maps may be referred back to the original CT image input into the EfficientNet-B2 network 106 by first reducing the number corresponding to the quantity of nodes of the EfficientNet-B2 network 106 by a factor of $2^n$, then rescaling the mappings back to the original size of the original CT image input into the EfficientNet-B2 network 106 and overlay the rescaled mappings on the original CT image. Thus, Grad-CAM may visually highlight possible ICH locations.

Figure 3:
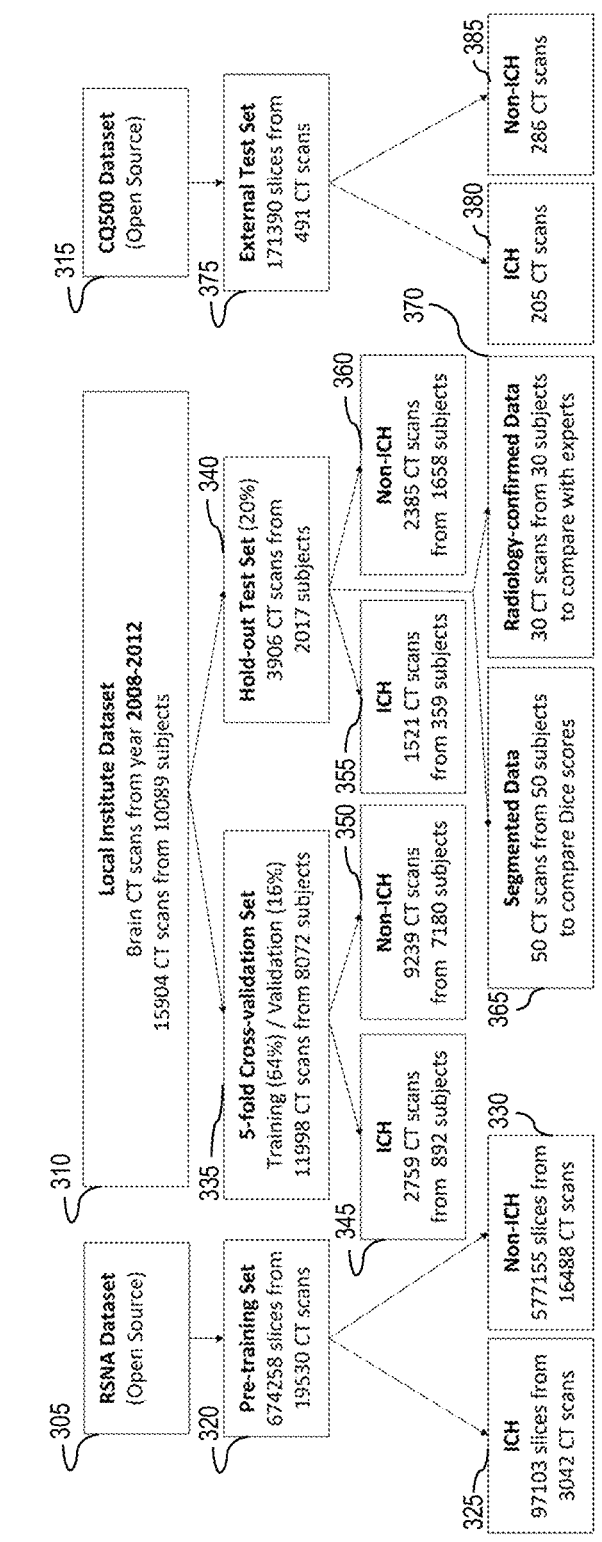
FIG. 3 is a flowchart that illustrates an exemplary flow of data from various datasets in an experimental evaluation of an exemplary DL model.

FIG. 3 is a flowchart 300 that illustrates an exemplary flow of data from various datasets in an experimental evaluation of an exemplary DL model. Exemplary evaluation of the systems and methods described herein was performed using three CT scan datasets: the RSNA dataset 305 for pre-training (320) the DL model, a local institution dataset 310 for end-to-end training and fine-tuning the DL model, and an external CQ500 dataset 315 for test and validation of the DL model. The RSNA dataset 305, released by the Radiological Society of North America (RSNA) in 2019, is the largest public ICH dataset, containing 19,530 head CTs with 674,258 slices in total collected from multiple institutions and labeled at the slice level by more than 60 radiologists. Each slice was labeled for the presence of ICH 325 or for absence of ICH (non-ICH 330). The local institution dataset 310 was developed from 15,904 CT scans and diagnoses performed on 10,089 subjects at a hospital. Finally, the CQ500 dataset 315 was used as an independent external test dataset 375 to test and evaluate the DL model. The CQ500 dataset 315 (and constituent external test set 375) includes 491 CT scans and a total of 171,390 slices collected from six radiology centers in New Delhi, India. They were labeled at the scan level and annotated by three senior radiologists for the presence of ICH 380 or for absence of ICH (non-ICH 385). These datasets were used individually for model pre-training (RSNA dataset 305), end-to-end model tuning and fine-tuning (local institution dataset 310), and external validation (CQ500 dataset 315).

The local institution data of the local institution dataset 310 were acquired on multiple CT scanners, and all patients from 2008 to 2012 who underwent head CT scans were included, regardless of whether they had undergone surgery. CTs were annotated at the scan level with labels of diagnoses extracted from the radiology reports by natural language processing (NLP) methods. Only scan-level labels are included in the local institution dataset 310, and the scan-level labels only provide the binary labels of "ICH" or "normal". These annotations were used as the gold standard (e.g., non-ICH 330 or ICH 325). Five-fold cross-validation of the local institution dataset 310 was used to improve the model's generalization, where 80% of the data was split into the 5-fold cross-validation set 335 for training (64%) and validation (16%), and the remaining 20% was the fixed hold-out test set 340. No subjects overlapped in the different split cohorts. The 5-fold cross-validation set 335 was separated into an ICH set 345 and a non-ICH set 350. The hold-out test set 340 was separated into an ICH set 355 and a non-ICH set 360. Additionally, 50 CT scans from the hold-out test set 340 were designated as segmented data 365 and manually segmented into ICH subtypes by radiologists at the pixel level to quantify the visualization performance of the model (e.g., mappings that potentially localized ICH) using Grad-CAM. Furthermore, another 30 CT scans were randomly selected from the hold-out test set 340 as radiology-confirmed data 370 and diagnostically confirmed by another two radiologists at the scan level for comparison to the predictions from the model.

Evaluation and Results

An exemplary DL model as described herein with respect to FIGS. 1A, 1B, 1C, 2, and 3 was built, trained, tested and validated. Results of the tests and validations included comparing results with diagnoses provided by senior radiologists, as well as statistical analyses of the model performance.

Comparison with Senior Radiologists

Thirty (30) CT scans were randomly selected from the hold-out test data set 340 for radiologist interpretation and confirmation of the DL model's diagnoses (radiology-confirmed data 370). Two experienced radiologists were asked to confirm those 30 testing cases in a double-blind clinical setting. For comparison of the performance from the model, two radiologists provided the overall diagnosis (i.e., ICH or non-ICH) of each scan as well as the associated positional details and they recorded the estimated time to diagnose each scan in minutes. The ground truth of these 30 selected cases was doubly confirmed by a third senior radiologist by reviewing radiology reports and the scans themselves to resolve diagnostic discrepancies between two radiologists.

Statistical Analysis

To evaluate the model performance, we calculated accuracy, PPV, sensitivity, specificity, F1 score, and area under the receiver operating characteristic curve (AUC) on both the held-out local test set 340 and the external CQ500 test set 375. The mean and standard deviation values were calculated from five-fold trained models and an ensemble result was calculated by averaging the output probabilities from the five-fold trained models. The Dice score was calculated for 50 CT scans (segmented data 365) from the hold-out test set 340 between the radiologists' manually labeled CT segments and the model-generated Grad-CAM mappings. To compare the performance of the model and the experts, we calculated all these metrics except for AUC scores for the two radiologists and the model on another 30 CT scans (radiology-confirmed data 370). Evaluation metrics were compared using the McNemar test for paired samples except for the diagnosis time, which was compared using the paired sample t-test. All evaluations were performed using the Scikit-learn and the SciPy packages in Python 3.7.

Data Characteristics

The RSNA dataset 305 was annotated at the slice level while the local institute dataset 310 and the CQ500 dataset 315 were annotated at the scan level. Detailed information regarding the number of scans and slices, label type, distribution of ICH vs. non-ICH, age, and female vs. male ratios are shown in Table 2. A total of 15904 CT scans from 10089 subjects (mean age, 53 years±19 [standard deviation]; 8258 women) from the local institute dataset 310 were involved in the test and validation. The rate of ICH among subjects in the hold-out test set 340 (1521 of 3906 [39%]) was higher than that in the 5-fold cross-validation dataset 335 (2759 of 11998 [23%]). For the external CQ500 test set 375, the number of ICH scans was relatively equal to the number of non-ICH scans (205 of 491 [42%]).

TABLE 2

Characteristics of the datasets used in the exemplary model tests and evaluations.

| | RSNA data (Pre-train) | Our institution's data (Finetune + internal testing) | CQ500 data (External testing) |
|---|---|---|---|
| No. of scans | 19530 | 15904 | 491 |
| No. of slices | 674258 | 667968 | 171390 |
| Label type | Slice | Scan | Scan |
| Distribution (ICH/Non-ICH) and [Percentage of ICH] | 97103/577155 [14.4%] | 5291/10613 [33.2%] | 205/286 [41.8%] |
| Age (Range, Mean ± SD*) | N/A | 18-89 years 53.26 ± 18.54 | 7-95 years |
| Sex (F/M) | N/A | 8258/7646 | 178/313 |

*SD = Standard Deviation

Evaluation on Local Institute Dataset 310 and CQ500 Dataset 315

Table 3 demonstrates the performance of the DL model described herein on the hold-out test set 340 and the external test set 375. For the hold-out test set 340, the model achieved an accuracy of 0.913 (±0.004), an F1 of 0.851 (±0.008), a PPV of 0.871 (±0.009), a sensitivity of 0.834 (±0.011), a specificity of 0.894 (±0.008) and an AUC of 0.952 (±0.001). The averaged ensemble model improved the overall model performance to an accuracy of 0.918, an F1 of 0.857, a PPV of 0.884, a sensitivity of 0.835, a specificity of 0.897 and an AUC of 0.956. The model showed good generalizability to an external dataset CQ500, with an accuracy of 0.931

(±0.006), an F1 of 0.882 (±0.006), a PPV of 0.886 (±0.010), a sensitivity of 0.880 (±0.013), a specificity of 0.892 (±0.011) and an AUC of 0.957 (±0.005). Likewise, the ensemble model improved the overall model performance, achieving an accuracy of 0.937, an F1 of 0.891, a PPV of 0.894, a sensitivity of 0.886, a specificity of 0.896 and an AUC of 0.962.

TABLE 3

Model evaluations (mean ± SD* and the averaged ensemble among 5 folds) on the hold-out test set 340 (n = 3906) and the external test set 375 (n = 491) at scan-level.

| | Hold-out test set 340 | | External test set 375 | |
|---|---|---|---|---|
| Metrics | Average across folds | Average ensemble | Average across folds | Average ensemble |
| Accuracy | 0.913 ± 0.004 | 0.918 | 0.931 ± 0.006 | 0.937 |
| F1 | 0.851 ± 0.008 | 0.857 | 0.882 ± 0.006 | 0.891 |
| PPV | 0.871 ± 0.009 | 0.884 | 0.886 ± 0.010 | 0.894 |
| Sensitivity | 0.834 ± 0.011 | 0.835 | 0.880 ± 0.013 | 0.886 |
| Specificity | 0.894 ± 0.008 | 0.897 | 0.892 ± 0.011 | 0.896 |
| AUC | 0.952 ± 0.001 | 0.956 | 0.957 ± 0.005 | 0.962 |

*SD = Standard Deviation

Attention Interpretability and Grad-CAM Visualizations

Attention weights were applied and Grad-CAM was utilized to improve the interpretability of the DL model and to encourage radiologists to better trust the model. The attention weights were used to find ICH at the slice level and to specify on which slice ICH was present. Next, Grad-CAM was applied to generate heatmaps of that specified slice, highlighting discriminative regions where the model made its diagnostic decisions, i.e., further locating ICH in a specific region of that slice. The results of some examples from the hold-out test set 340 are shown in FIGS. 4A-4D and 5A-5B.

Figures 4A, 4B, 4C, 4D:
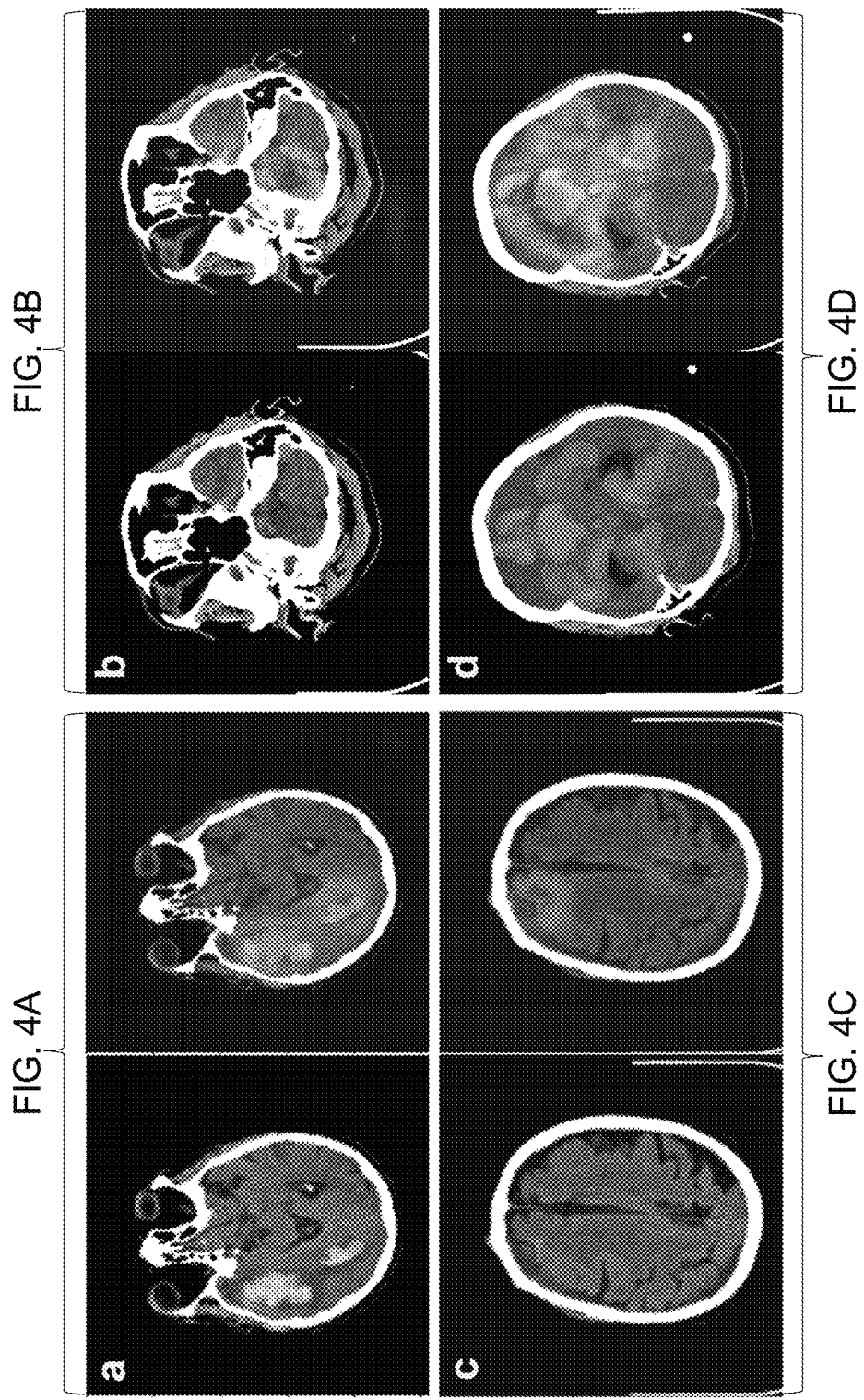
FIGS. 4A, 4B, 4C, and 4D are exemplary CT scan and Grad-CAM-generated heatmap images that illustrate important features for predicting ICH and that visualize the possible regions of ICH in a head CT scan.

FIGS. 4A, 4B, 4C, and 4D are exemplary CT scan and Grad-CAM-generated heatmap images that illustrate important features for predicting ICH and that visualize the possible regions of ICH in a head CT scan. Each of FIGS. 4A, 4B, 4C, and 4D show the raw CT image on the left and the Grad-CAM-generated heatmap on the right. Heatmaps were color-coded, where the darker the region, the greater the contribution to the classification result. FIGS. 4A and 4C illustrate examples from the local institute dataset 310 that have not been annotated by radiologists. FIGS. 4B and 4D illustrate examples from the local institute dataset 310 that have been manually annotated by radiologists, showing a mask superimposed over the CT scan image on the left to represent the presence of ICH and possible ICH regions are highlighted in the heatmaps on the right. In the examples, the heatmaps in FIG. 4A identified parenchymal and intraventricular hemorrhage and FIG. 4C identified subarachnoid hemorrhage. The model-generated heatmaps were further compared with the radiologists' manually labeled masks and they were found to be highly consistent regardless of whether the regions of ICH were small, for example, the intraventricular hemorrhage in FIG. 4B, or large, for example, the subarachnoid and intraventricular hemorrhage in FIG. 4D.

It is considered that heatmaps represent a rough localization of ICH but were not intended for precise segmentation as labeled by radiologists. Therefore, the performance of attentional weights in classifying ICH at the slice level and the performance of heatmaps in segmenting ICH on predicted ICH slices were further quantified by calculating AUC scores and Dice scores between model-generated heatmaps and radiologists' manually labeled masks on a subset of the hold out test set 340 (radiology-confirmed data 370). The overall AUC score reached 0.82 (±0.10) on a sample of 30 manually segmented CT scans and the overall Dice score reached 0.64 (±0.27) on slices that were predicted to contain ICH in these 30 scans.

FIGS. 5A, 5B are exemplary CT scan and Grad-CAM-generated heatmap images and corresponding graphs that illustrate interpretability of the weakly supervised DL model for localizing ICH at the slice and pixel level. The DL model was trained at the scan level, but the attention weights indicate the probability of each slice being an ICH from 0 to 1 (col. 5). The DL model generated heatmaps on predicted ICH slices (selected by arrows at the top of the graphs in col. 5) to localize specific ICH regions (col. 4). The heatmaps were converted to a pixel-level mask and quantified by Dice scores (col. 3), which were computed by matching with the ground truth segments (col. 2) manually annotated by radiologists onto the original CT scan (col. 1).

In an example, FIGS. 5A-5B, col. 5 demonstrates the correlation distribution between attention weights predicted by the DL model (i.e, lines with heads that do not rise above 0.6 on the y-axis) and the ground truth annotated by radiologists (i.e, highlighted areas in which the lines with heads rise above 0.8 on the y-axis) at the slice level. The high correlation of the two distributions suggests that attention weights can successfully detect slice-level ICH in a given scan. Next, two slices predicted to have ICH were selected (as pointed to by arrows above the heads of the lines in the graphs of col. 5) and heatmaps were generated by using Grad-CAM, as shown in FIGS. 5A-5B, col. 4. By using a threshold of 0.5, heatmaps were converted to binary masks and achieved a Dice score of 0.78 in FIG. 5A and a Dice score of 0.46 in FIG. 5B. It is worth noting that the local institute dataset 310 was only labeled at the scan level, but the attention weights were able to specify the ICH at the slice level and heatmaps were able to further locate the ICH regions within each slice.

Comparison with Senior Radiologists

Figure 6:
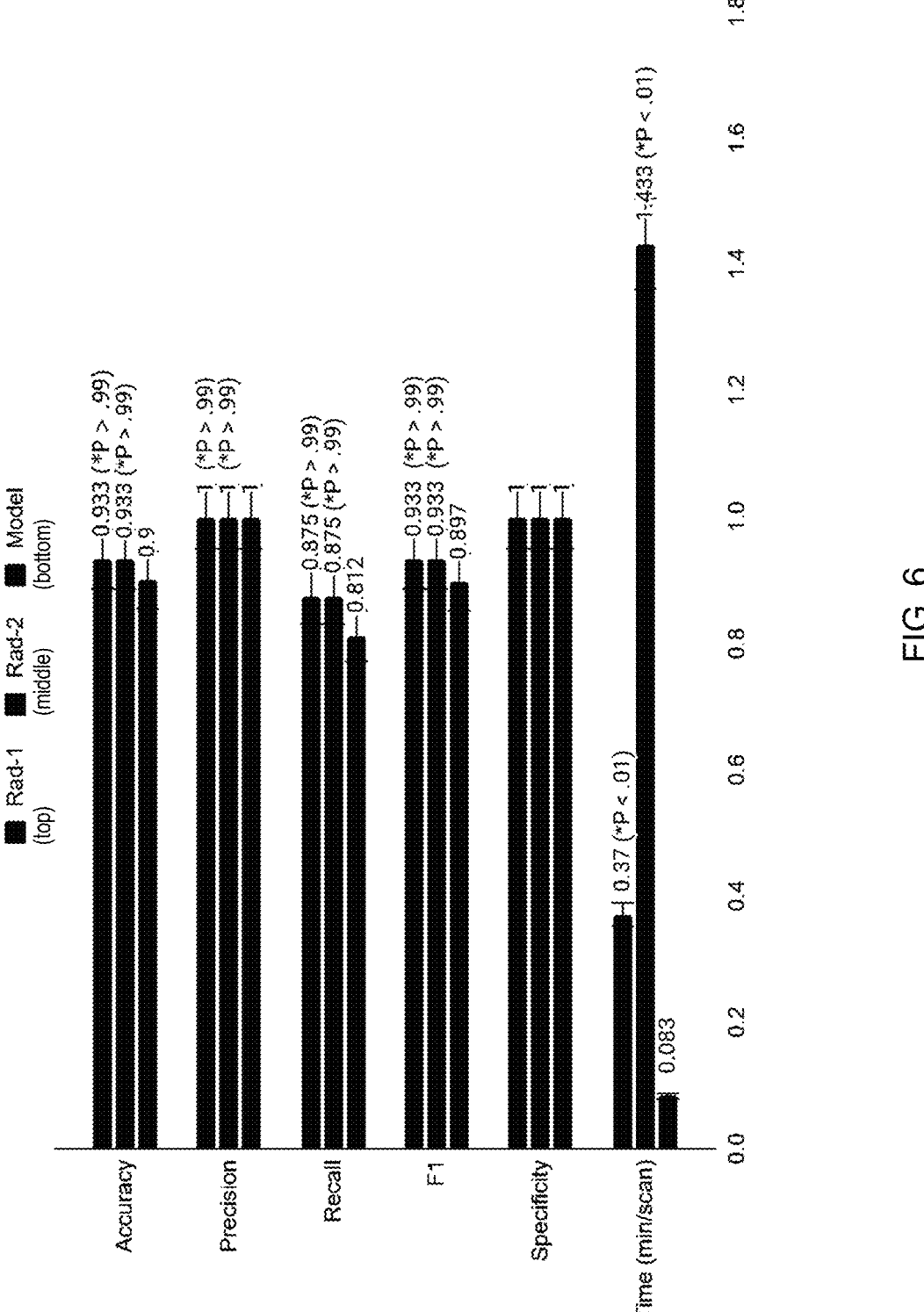
FIG. 6 is a graph illustrating a comparison of exemplary DL model performance vs. performance of two senior radiologists on the 30 CT scans of the radiology-confirmed data randomly selected from the hold-out test set of the local institute dataset of CT scans.

FIG. 6 is a graph illustrating a comparison of exemplary DL model performance vs. performance of two senior radiologists on the 30 CT scans of the radiology-confirmed data 370 randomly selected from the hold-out test set 340 of the local institute dataset 310 of CT scans. Of the cases illustrated in FIG. 6, fifteen (15) were ICH CTs and fifteen (15) were non-ICH CTs. The error bars shown in FIG. 6 denote the 95% confidence intervals. Data in parentheses are P values for comparison with the model performance. P<0.05 indicates the comparison is statistically significant. The DL model achieved an overall accuracy of 0.9 (27 of 30), a PPV of 1.0, a sensitivity of 0.812, a specificity of 1.0 and an F1 score of 0.897 on this sample set (radiology-confirmed data 370). Two radiologists achieved better performances than the model with an accuracy of 0.933 (28 of 30, P>0.99), a PPV of 1.0 (P>0.99), a sensitivity of 0.875 (P>0.99), a specificity of 1.0 (P>0.99) and an F1 score of 0.933 (P>0.99). Both radiologists and the model misclassified the same ICH case as non-ICH. In addition, two radiologists each misclassified a different ICH case as non-ICH and the model misclassified two ICH CTs as non-ICH, one of which was the same as Radiologist-2. Notably, the model analyzed this subset of 30 CT scans in 0.083 minute each, significantly shorter than each individual radiologist (P<0.01), who analyzed each scan in 0.370 minute and 1.422 minute.

DISCUSSION

A weakly supervised ICH detection workflow has been described, tested, and validated, as discussed herein. The ICH detection workflow has been tested and validated to classify and localized ICH at the slice level while training with only scan-level labels. This DL model was trained on the local institute dataset 310, which is one of the largest ICH clinical datasets other than the RSNA dataset 305. Overall, the DL model achieved an F1 of 0.857 and an AUC of 0.956 on the local institute dataset 310 and an F1 of 0.891 and an AUC of 0.962 on an external CQ500 dataset 315. The DL model provided interpretability and visualization at each slice level, improving its reliability for clinical use. Finally, the DL model achieved a performance comparable (P>0.99) to that of two senior radiologists on a random sample set, but in much less time (P<0.01).

Described herein is a complete end-to-end ICH detection pipeline that may provide ICH detection in CT scans without manual annotations by radiologists (beyond that provided by transfer learning from the RSNA dataset 305). The DL model may be pre-trained using a large existing database. Since TL is useful in mitigating overfitting and improving model performance, the valuable medical datasets that already exist may be put to good use in training the DL model. For example, the source domain (e.g., RSNA dataset 305) has been utilized to pre-train the exemplary model tested and validated as described herein, so that the DL model may learn detailed features from the slice level of the source domain, thus benefiting the target domain (e.g., the local institute dataset 310). Therefore, preparing time-consuming slice-level labels for the target dataset may not be needed. The DL model has been fine-tuned as described herein on the local institute dataset 310 with scan labels that were automatically extracted from radiology reports using NLP. The full ICH detection workflow described herein may eliminate the cost of any manual labeling by radiologists, while achieving detailed predictions at each slice. This weakly supervised approach has important implications for applying DL methodologies to other medical images of any kind of modality, such as magnetic resonance imaging (MM) images and X-ray images.

When implementing DL algorithms in clinical practice, concerns have been raised about the lack of transparency and interpretability of the model. The lack of transparency may make it hard for radiologists to trust DL models, especially in consideration of ethical and legal issues. Understanding exactly why models make such predictions may help persuade radiologists to trust the systems utilizing the DL models. To address this, attention-based bidirectional-LSTM and the Grad-CAM were applied to select slices with ICH within a scan and localized ICH at specific regions in a slice. Specifically, the bidirectional-LSTM facilitated the DL model to consider interslice dependencies from both sides of a slice, while the attention module facilitated assigning an importance score to each slice that was representative of the slice-level labeling. The accuracy of attention weights in predicting slice-level labels was confirmed by the consistency between the attention weights and the ground truth labels. Moreover, although the DL model described herein was trained at the scan level, it was capable of predicting pixel-level outcomes by using Grad-CAM. Experiments performed and described herein were designed to quantify the performance of attention weights and Grad-CAM by comparing the model-generated results with radiologist-annotated labels. Notably, without providing any pixel-labeled training dataset, the DL model achieved an AUC of 0.82 for predicting ICH at the slice level and a Dice score of 0.64 for ICH segmentation on each slice at the pixel level. Thus, the DL model-based ICH detection workflow described herein addresses the "black box" issue of DL by providing reasonable interpretability of the following operations: flagging ICH for CT scans, subtyping ICH for each slice, and localizing ICH for specific regions. This may be of great clinical significance as interpretability improves the reliability of the model and may support clinical decision making in the near future.

How well the DL model generalizes to new data is another significant factor to consider in clinical practice. Tests and evaluations of the DL model on an external dataset CQ500 are discussed herein, and the results demonstrated good generalizability. The average ensemble reduced the dispersion of predictions for each fold and improved the overall model performance on the hold-out testing dataset 340 and its robustness on the external test set 375. One reason for such a good generalization of the DL model described herein is that two huge datasets (e.g., RSNA dataset 305 and local institute dataset 310) from multiple institutions with different CT scanners and acquisition protocols were used during the training process of the DL model. Moreover, all CTs in the local institute dataset 310 were used (i.e., without any selection criteria), so there was no selection bias. These may ensure that the DL model described herein may be generalizable to other CT datasets, such as the CQ500 dataset 315, with multiple slice thicknesses and different acquisition protocols.

To demonstrate the potential of implementing the DL model and system described herein in a real-world clinical setting, the DL model performance was compared herein to two senior radiologists' diagnoses on a random sample set of 30 CT scans (radiology-confirmed data 370). The DL model achieved comparable performance to both radiologists (P>0.99), with the model having three false-negative results, while the two radiologists each had two false-negative results. Specifically, both radiologists and the model misclassified the same case of a right tentorial leaflet subdural hemorrhage as non-ICH. Beam-hardening artifacts caused by bullet fragments limited the evaluation of this case. The other two misclassifications made by the DL model were (1) trace hemorrhage in the lateral ventricles, which was also misclassified by Radiologist-2 due to its small size, and (2) bilateral intraventricular hemorrhage in the setting of prior craniotomy, in which postsurgical changes resulted in artifacts. Although the DL model performed slightly worse than the experts, it took significantly less diagnostic time per scan (P<0.01), on average ten (10) times faster than two senior radiologists, providing strong evidence of the utility of the DL model and system in improving the efficiency of triage protocols. Particularly when there is a large number of patients scanned per day, the DL model and system described herein may help prevent human errors associated with a large workload and may prioritize patients for radiologists to see first. Notably, the DL model described herein achieved a high PPV on both internal and external test sets. It is important to have a high PPV so that radiologists are not repeatedly alerted to address false-positive critical findings by ICH hemorrhage detection models. Repeated alerts may interrupt radiologist workflow, make them less efficient, and result in alert fatigue where the radiologist starts ignoring the DL model alerts and even the DL model's findings altogether.

Further additions to the DL model for ICH detection to further boost the overall ICH detection performance may include finding and codifying causal relationships between the labels predicted by the model and the labels predicted by NLP of radiology reports corresponding to dataset used for training of the DL model. In addition, most misclassifications of the CT scans as ICH or non-ICH were found in post-operative CT scans, in which there were significant artifacts due to the presence of metallic implants, hyperdense drains and catheters, and motion artifacts. These misclassifications may be addressed by creating a separate DL model specifically trained for those cases in which sources of artifacts such as these are present. Finally, although the DL model for ICH detection described herein was found to be more efficient at detecting ICH compared to senior radiologists, evaluations of the DL model's performance in clinical workflows may also comprehensively quantify and compare the performance of radiologists that utilize the assistance of the DL model and system described herein in their clinical workflows with the performance of radiologists that do not.

The weakly supervised DL model described herein may predict and localize ICH at the slice level without any manual annotations by radiologists. Tests and evaluations of the DL model described herein show that the DL model achieved performance levels similar to two senior radiologists and was highly generalizable to external testing datasets. Furthermore, the DL model may provide a way to show clear interpretability for radiologists. The workflow utilizing the DL model described herein may be implemented in real-world clinical settings via an automated alert or priority system to reduce the detection time and treatment of intracranial hemorrhage.

An exemplary ICH detection system and method utilizing weakly-supervised neural networks and transfer learning (TL) as described herein demonstrated performance metrics comparable to two senior radiologists. The exemplary model was pre-trained on the RSNA dataset at the slice level and was next trained on a local dataset using attention-based bidirectional long-short-term memory (LSTM) networks. The model weighted each slice of the scan against the final ICH diagnosis using an attention-based LSTM network, where the attention weights represented the slice-level ICH predictions. The local dataset involved 15,904 CT scans from 10,089 subjects. The scan images were labeled for ICH based on their corresponding radiology reports, and without additional manual annotations by radiologists. The scan labels were extracted from radiology reports using natural language processing (NLP). The localization ability of the model-generated visual map was quantified by comparison with pixel-labeled segments from radiologists. The model's generalizability was evaluated on an external independent dataset with a low false positive rate/high positive predictive value (PPV). The model performance was compared to two senior radiologists on thirty (30) random test scans using a McNemar test.

The exemplary system and method was determined to be highly generalizable with good interpretability and high positive predictive values (PPVs) of ICH diagnoses. In experimental evaluations of the exemplary system and method described herein, scan-level ICH detection achieved a PPV of 0.884 (88.4%) and an (AUC) of 0.956 (95.6%) on held-out local datasets (i.e., 1521 of 3906 hemorrhages). The local dataset had a mean age of 54 years±a standard deviation [SD] of 19, and included 1101 women. A PPV of 0.894 and an AUC of 0.962 was achieved on external test datasets (i.e., 205 of 491 hemorrhages). The external dataset had an age range of 7-95 years, and included 178 women. For thirty (30) randomly tested CT samples, the model achieved a PPV of 1.0, with an average diagnostic time cost per scan of 0.083 minute compared to 1.0 (P>0.99) and 0.37 minute (P<0.01) and 1.0 (P>0.99) and 1.433 minute (P<0.01) for each of two radiologists.

In addition, the attention mechanism and model-generated heatmaps of the exemplary system and method described herein improved slice-level interpretations of predictions in experimental evaluations. The attention weights and heatmaps from the models visually agreed with radiologists' interpretation of the slices. Also, the experimental evaluations showed that the exemplary system and method described herein was significantly faster (e.g., 0.083 minutes/scan, P<0.01) when compared to the average diagnostic time cost of radiologists. The performance of the exemplary system and method described herein was not statistically different from the two senior radiologists without the need for labor-intensive slice-by-slice labeling beyond transfer learning from the RSNA dataset.

The functions, acts or tasks illustrated in the Figures or described may be executed in a digital and/or analog domain and in response to one or more sets of logic or instructions stored in or on non-transitory computer readable medium or media or memory. The functions, acts or tasks are independent of the particular type of instructions set, storage media, processor or processing strategy and may be performed by software, hardware, integrated circuits, firmware, microcode and the like, operating alone or in combination. The memory may comprise a single device or multiple devices that may be disposed on one or more dedicated memory devices or disposed on a processor or other similar device. When functions, steps, etc. are said to be "responsive to" or occur "in response to" another function or step, etc., the functions or steps necessarily occur as a result of another function or step, etc. It is not sufficient that a function or act merely follow or occur subsequent to another. The term "substantially" or "about" encompasses a range that is largely (anywhere a range within or a discrete number within a range of ninety-five percent and one-hundred and five percent), but not necessarily wholly, that which is specified. It encompasses all but an insignificant amount.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A system for slice-level localization of intracranial hemorrhage (ICH) on head computed tomography (CT) scans, the system comprising:

at least one device including a hardware computing processor; and a non-transitory memory having stored thereon computing instructions, executable by the hardware computing processor, to perform operations of a method for slice-level localization of intracranial hemorrhage (ICH) on head computed tomography (CT) scans, the method comprising:

configuring a deep learning (DL) model including a convolutional neural network (CNN) and a recurrent neural network (RNN);

initializing the CNN with first trained data for extracting important features from a CT scan for detecting an ICH;

initializing the RNN with second trained data for detecting an ICH in a CT scan;

inputting a CT scan into the CNN;

performing convolutional neural network processing of the CT scan by the CNN for extracting important features from the CT scan for detecting an ICH;

outputting slices of the CT scan that was processed, including extracted important features, from the CNN to pipelines of the RNN, wherein each pipeline comprises serially concatenated groupings of processing modules, wherein each grouping of processing modules comprises a fully-connected module, a leaky rectified linear unit, and a dropout module;

processing each slice of the slices of the CT scan that was processed, in parallel, by a corresponding pipeline of the pipelines of the RNN;

processing, by a bi-directional long-short term memory module, outputs from each pipeline, wherein attention weights of the bi-directional long-short term memory module are configured to predict slice-level labels of each slice of the slices of the CT scan that was processed;

processing, by an attention module, outputs, of the slice-level labels of each slice of the slices of the CT scan that was processed, received from the bi-directional long-short term memory module, wherein the bi-directional long-short term memory module is configured to determine an ICH diagnosis of the CT scan; and outputting the ICH diagnosis.

2. The system of claim 1, wherein initializing the CNN with first trained data comprises training the CNN on a first dataset of CT scans including slice-level labels indicating presence status of ICH.

3. The system of claim 1, wherein initializing the RNN with second trained data comprises freezing the trained weight values of the CNN and training the RNN on a second dataset of CT scans including scan-level labels indicating presence status of ICH.

4. The system of claim 1, wherein the method further comprises fine-tuning the CNN and RNN by performing end-to-end DL model training with a third dataset of CT scans including scan-level labels indicating presence status of ICH.

5. The system of claim 1, wherein the method further comprises generating heatmaps showing important features for diagnosing ICH in CT slices based on gradient information flowing back to the last convolutional layer of the CNN.

6. The system of claim 1, wherein the CNN includes an EfficientNet-B2 network.

7. The system of claim 1, wherein the method further comprises preprocessing the CT scan prior to inputting the CT scan into the CNN, the preprocessing including applying a plurality of different window functions to the CT scan, concatenating results of applying the different window functions to the CT scan in a third dimension orthogonal to the image axes of the CT scan, and inputting the concatenated windowed CT scans into the CNN.

8. The system of claim 1, wherein outputting the processed CT scan including the extracted important features from the CNN to the RNN comprises reducing the feature size of the processed CT scan to a vector by a global average pooling (GAP) layer and outputting the vector to the RNN as extracted features for each slice.

9. The system of claim 1, wherein the method further comprises outputting probabilities of ICH by a last fully-connected layer of the CNN followed by a sigmoid activation function.

10. A non-transitory computer readable medium having stored thereon computer-readable instructions executable by a hardware computing processor to perform operations of a method for slice-level localization of intracranial hemor-rhage (ICH) on head computed tomography (CT) scans, the method comprising:

configuring a deep learning (DL) model including a convolutional neural network (CNN), a plurality of network pipelines in parallel that receive respective data from the CNN, each network pipeline of the plurality of network pipelines including three serially coupled groupings of a fully connected layer, a LeakyReLU activation function, and a dropout layer, a bi-directional long-short term memory module config-ured to receive data from the plurality of network pipelines, and an attention module that receives data from the bi-directional long-short term memory mod-ule;

initializing the CNN with first trained data for extracting important features from a CT scan for detecting an ICH;

initializing the plurality of network pipelines, bi-direc-tional long-short term memory module, and attention module with second trained data for detecting an ICH in a CT scan;

inputting a CT scan into the CNN;

performing convolutional neural network processing of the CT scan by the CNN for extracting important features from the CT scan for detecting an ICH;

outputting slices of the CT scan that was processed, including extracted important features, from the CNN to the plurality of network pipelines;

processing each slice of the slices of the CT scan that was processed, in parallel, by a corresponding network pipeline of the plurality of network pipelines;

processing, by the bi-directional long-short term memory module, outputs from each network pipeline of the plurality of network pipelines, wherein attention weights of the bi-directional long-short term memory module are configured to predict slice-level labels of each slice of the slices of the CT scan that was processed;

processing, by the attention module, outputs of the slice-level labels of each slice of the slices of the CT scan that was processed received from the bi-directional long-short term memory module, wherein the bi-direc-tional long-short term memory module is configured to determine an ICH diagnosis of the CT scan; and outputting the ICH diagnosis.

11. The medium of claim 10, wherein initializing the CNN with first trained data comprises training the CNN on a first dataset of CT scans including slice-level labels indicating presence status of ICH.

12. The medium of claim 10, wherein initializing the plurality of network pipelines, bi-directional long-short term memory module, and attention module with second trained data comprises freezing the trained weight values of the CNN and training the plurality of network pipelines, bi-directional long-short term memory module, and attention module on a second dataset of CT scans including scan-level labels indicating presence status of ICH.

13. The medium of claim 10, wherein the method further comprises fine-tuning the CNN and the plurality of network pipelines, bi-directional long-short term memory module, and attention module by performing end-to-end DL model training with a third dataset of CT scans including scan-level labels indicating presence status of ICH.

14. The medium of claim 10, wherein the method further comprises generating heatmaps showing important features for diagnosing ICH in CT slices based on gradient informa-tion flowing back to the last convolutional layer of the CNN.

15. The medium of claim 10, wherein the CNN includes an EfficientNet-B2 network.

16. The medium of claim 10, wherein the method further comprises preprocessing the CT scan prior to inputting the CT scan into the CNN, the preprocessing including applying a plurality of different window functions to the CT scan, concatenating results of applying the different window func-tions to the CT scan in a third dimension orthogonal to the image axes of the CT scan, and inputting the concatenated windowed CT scans into the CNN.

17. The medium of claim 10, wherein outputting the processed CT scan including the extracted important fea-tures from the CNN to the plurality of network pipelines comprises reducing the feature size of the processed CT scan to a vector by a global average pooling (GAP) layer and outputting the vector to the plurality of network pipelines as extracted features for each slice.

18. The medium of claim 10, wherein the method further comprises outputting probabilities of ICH by a last fully-connected layer of the CNN followed by a sigmoid activa-tion function.

19. A method for slice-level localization of intracranial hemorrhage (ICH) on head computed tomography (CT) scans, the method comprising:

initializing an EfficientNet-B2 network with first trained data for extracting important features from a CT scan for detecting an ICH;

initializing, with second trained data for detecting an ICH in a CT scan, a plurality of network pipelines disposed in parallel, a bi-directional long-short term memory module coupled to outputs of the plurality of network pipelines, and an attention module coupled to outputs of the bi-directional long-short term memory module, wherein each network pipeline of the plurality of network pipelines comprises serially concatenated groupings of processing modules, wherein each group-ing of processing modules comprises a fully-connected module, a leaky rectified linear unit, and a dropout module;

preprocessing an input CT scan, the preprocessing includ-ing applying a plurality of different window functions to the CT scan, concatenating results of applying the different window functions to the CT scan in a third dimension orthogonal to the image axes of the CT scan, and inputting the concatenated windowed CT scans into the EfficientNet-B2 network;

performing convolutional neural network processing of the CT scan by the EfficientNet-B2 network for extract-ing important features from the CT scan for detecting an ICH;

outputting slices of the CT scan that was processed, including the extracted important features from the EfficientNet-B2 network, to the plurality of network pipelines;

processing each slice of the slices of the CT scan that was processed, in parallel, by a corresponding network pipeline of the plurality of network pipelines;

processing, by the bi-directional long-short term memory module, outputs from each network pipeline of the plurality of network pipelines, wherein attention weights of the bi-directional long-short term memory module are configured to predict slice-level labels of each slice of the slices of the CT scan that was processed;

processing, by an attention module, outputs, of the slice-level labels of each slice of the slices of the CT scan that was processed, received from the bi-directional long-short term memory module, wherein the bi-directional long-short term memory module is configured to determine an ICH diagnosis of the CT scan;

generating heatmaps showing important features for diagnosing ICH in CT slices based on gradient information flowing back to the last convolutional layer of the EfficientNet-B2 network; and outputting the ICH diagnosis.

20. The method of claim 19, further comprising:

fine-tuning the EfficientNet-B2 network and the plurality of network pipelines, bi-directional long-short term memory module, and attention module by performing training with a dataset of CT scans including scan-level labels indicating presence status of ICH.

* * * * *